US008559691B2

(12) United States Patent
Borghese et al.

(10) Patent No.: US 8,559,691 B2
(45) Date of Patent: Oct. 15, 2013

(54) DYNAMIC ERROR CORRECTION IN RADIOGRAPHIC IMAGING (75) Inventors: Nunzio Alberto Borghese, Milan (IT); Eros Nanni, Castel S. Pietro (IT); Giuseppe Rotondo, Pantigliate-Milano (IT)

(73) Assignee: CEFLA S.C. (IT)

( * ) Notice: Subject to any disclaimer, the term of this patent is extended or adjusted under 35 U.S.C. 154(b) by 1019 days.

(21) Appl. No.: 12/502,704

(22) Filed: Jul. 14, 2009

(65) Prior Publication Data
US 2010/0008559 A1 Jan. 14, 2010

(30) Foreign Application Priority Data

Jul. 14, 2008 (EP) .................................... 08160359

(51) Int. Cl.
*G06K 9/00* (2006.01)
*G01N 23/04* (2006.01)

(52) U.S. Cl.
USPC ............................. 382/132; 382/131; 378/62

(58) Field of Classification Search
USPC .......... 382/128–132, 190, 195; 378/4, 19, 21, 378/62; 250/370.11, 370.09, 455; 128/922
See application file for complete search history.

(56) References Cited

U.S. PATENT DOCUMENTS

| 3,971,948 | A  | * | 7/1976  | Pfeiler et al. ....................... 378/5 |
| 5,761,331 | A  | * | 6/1998  | Clark, III ....................... 382/131 |
| 6,201,541 | B1 | * | 3/2001  | Shalom et al. ................. 345/419 |
| 6,256,364 | B1 | * | 7/2001  | Toth et al. .......................... 378/4 |
| 6,318,892 | B1 | * | 11/2001 | Suzuki et al. ................. 378/197 |
| 6,795,572 | B1 | * | 9/2004  | Matsuno ........................ 382/132 |
| 6,842,502 | B2 | * | 1/2005  | Jaffray et al. .................... 378/65 |
| 7,187,749 | B2 |   | 3/2007  | Suzuki |
| 7,657,304 | B2 | * | 2/2010  | Mansfield et al. ............. 600/427 |
| 7,680,247 | B2 | * | 3/2010  | Atzinger et al. .............. 378/116 |

(Continued)

FOREIGN PATENT DOCUMENTS

| EP | 1815794 A1 | 8/2007 |
| GB | 2384155 A  | 7/2003 |

OTHER PUBLICATIONS

Bajcsy et al. "Three Dimensional Volume Reconstruction . . . " Jan. 2006, pp. 30-45.*

(Continued)

*Primary Examiner* — Chan S Park
*Assistant Examiner* — Mia M Thomas
(74) *Attorney, Agent, or Firm* — St. Onge Steward Johnston & Reens LLC (57) ABSTRACT A method for radiographic imaging is described. Radiographic raw images of an object are generated by an imaging system comprising an X-ray source and an X-ray detector and moving along a given trajectory during an acquisition process of the radiographic images. During the generation of the radiographic raw images displacement data describing the displacement of the moving object are generated by means of a sensor arrangement and a control unit connected with the sensor arrangement. Finally views of the object are produced by image processing of the radiographic raw images in the control unit wherein the displacement data are used for compensating the motion of the object. For the compensation of the motion, the object is treated as stationary and the actual trajectory is replaced by a virtual trajectory resulting in a spatial relation between the stationary object and the imaging system on the virtual trajectory that corresponds to the spatial relation between the displaced object and the imaging system on the actual trajectory.

21 Claims, 4 Drawing Sheets

(56) References Cited

U.S. PATENT DOCUMENTS

| | | | |
|---|---|---|---|
| 7,920,261 B2* | 4/2011 | Jeys et al. | 356/338 |
| 7,929,661 B2* | 4/2011 | Borghese et al. | 378/38 |
| 8,135,111 B2* | 3/2012 | Jaffray et al. | 378/65 |
| 8,260,025 B2* | 9/2012 | Walimbe et al. | 382/132 |
| 2001/0048733 A1* | 12/2001 | Schulze-Ganzlin | 378/62 |
| 2002/0191829 A1* | 12/2002 | Sasada | 382/132 |
| 2003/0007602 A1* | 1/2003 | Sonobe et al. | 378/108 |
| 2004/0071258 A1* | 4/2004 | Okumura et al. | 378/19 |
| 2004/0190678 A1* | 9/2004 | Rotondo et al. | 378/38 |
| 2005/0031075 A1* | 2/2005 | Hopkins et al. | 378/57 |
| 2005/0031080 A1* | 2/2005 | Klingenbeck-Regn et al. | 378/95 |
| 2005/0031165 A1* | 2/2005 | Olson et al. | 382/103 |
| 2006/0149134 A1 | 7/2006 | Soper et al. | |
| 2006/0213996 A1* | 9/2006 | Crucs | 235/462.13 |
| 2006/0250133 A1* | 11/2006 | Krieg et al. | 324/318 |
| 2007/0092057 A1* | 4/2007 | Bruder et al. | 378/15 |
| 2007/0147589 A1* | 6/2007 | Thielemans | 378/207 |
| 2007/0172102 A1* | 7/2007 | Hempel | 382/128 |
| 2007/0183567 A1* | 8/2007 | Rotondo et al. | 378/38 |
| 2007/0189444 A1* | 8/2007 | Van Steven-Daal et al. | 378/6 |
| 2007/0297663 A1* | 12/2007 | Mundry | 382/131 |
| 2008/0183071 A1* | 7/2008 | Strommer et al. | 600/424 |
| 2008/0273656 A1* | 11/2008 | Ziegler et al. | 378/19 |
| 2009/0110254 A1* | 4/2009 | Vija et al. | 382/131 |
| 2009/0154641 A1* | 6/2009 | Thielemans | 378/21 |
| 2009/0245457 A1* | 10/2009 | Takeuchi et al. | 378/8 |
| 2010/0053614 A1* | 3/2010 | Jeys et al. | 356/343 |

OTHER PUBLICATIONS

Fessler et al. "Analytical Tomographic Image Reconstruction Methods . . . " Nov. 2009, pp. 1-47.*

Baltas et al. "The Role of Imaging in Radiotherapy Treatment Planning" CRC Press LLC, 2001, pp. 1-18.*

Schweiger, M. and Arridge, S.R., Image reconstruction in optical tomography, using local basis functions, J. Electronic Imaging, vol. 12, Issue 4, pp. 583-593, 2003.

Hartley, R. and Zisserman, A.: Multiple view geometry in Computer Vision, 2nd edition, Cambridge University Press, 2004; 52 pages.

Kak & Slaney; "Algebraic Reconstruction Algorithms"; Principle of Computerized Tomographic Imaging, SIAM Society, 2001; 12 pages.

Kak & Slaney; "Algorithms for Reconstruction with Nondiffracting Sources"; Principle of Computerized Tomographic Imaging, SIAM Society, 2001; 33 pages.

Laurent Desbat et al: "Compensation of Some Time Dependent Deformations in Tomography" IEEE Transactions on Medical Imaging, IEEE Service Center, Piscataway, NJ, US, vol. 26, No. 2, Feb. 1, 2007, pp. 261-269, XPOII161750 ISSN: 0278-0062.

Dobbins III, J.T. and Godfrey, D.J.; "Digital X-ray tomosynthesis: current state of the art and clinical potential"; Phys. Med. Biol. 48 (2003) R65-R106.

Extended European Search Report; EP 08 16 0359; Sep. 11, 2008; 8 pages.

Sebasti En Roux et al: "Exact reconstruction in 2D dynamic CT: compensation of time-dependent affine deformations; Affine deformation compensation in 2D CT" Physics in Medicine and Biology, Taylor and Francis Ltd. London, GB, vol. 49, No. 11, Jun. 7, 2004, pp. 2169-2182, XP020023724 ISSN: 0031-9155.

Wiskott, J. et al.; "Face recognition by elastic bunch graph matching"; In L.C. Jain et al., editor: Intelligent biometric techniques in fingerprints and face recognition, pp. 355-396. CRC Press, 1999.

Feris, R.S. et al.; "Hierarchical wavelet networks for facial feature localization"; IEEE International Conference on Automatic Face and Gesture Recognition, 2002, pp. 118-123.

Michel, D.; Frédéric; Hiroyuki, K.; "Improved two-dimensional rebinning of helical cone-beam computerized tomography data using John's equation"; Inverse Problems, vol. 19, Issue 6, pp. S41-S54, 2003.

Dargham, J. and Chekima, A.; "Lips Detection in the Normalised RGB Colour Scheme"; Proc. 2nd Conf. on Information and Communication technologies, ICCTA, 2006, pp. 1546-1551.

Shepp, L. A. and Vardi Y.; "Maximum Likelihood Reconstruction for Emission Tomography"; IEEE Trans. Med. Im., vol. 1, 113-122, 1982.

Middendorff, C.; Boweyer, K.; Yan, P.; "Multi-Modal Biometrics Involving the Human Ear"; Proc. IEEE Conf. CVPR 07, 2007.

Jain, A.K. and Ross, A.; "Multibiometric Systems"; Comm. ACM, Special Issue on Multimodal Interlaces, vol. 47, No. 1, pp. 34-40, 2004.

Frosio, I. and Borghese, N.A.; "Real-time accurate circle fitting with occlusions"; Pattern Recognition; vol. 41, pp. 101-114, 2008.

Ma, Y. et al.; "Robust precise eye location under probabilistic framework"; IEEE International Conference on Automatic Face and Gesture Recognition, 2004, pp. 339-344.

Benvenuto, F. and La Camera, A. et al.; "Study of an iterative method for the reconstruction of images corrupted by Poisson and Gauss noise"; Inverse Problems 24, 2008.

Kaledender, W. A.; "X-ray computed tomography"; Phys. Med. Biol. 51 (2006) R29-R43.

Huesman R H et al: "Direct list mode reconstruction for motion compensation", 2004 IEEE Nuclear Science Symposium Conference Record Oct. 16-22, 2004 Rome. Italy. IEEE. Piscataway, NJ. USA. vol. 6, Oct. 16, 2004. pp. 3953-3955.

European Search Report (relating to the European divisional application 12 179 042.2) Completed: Sep. 17, 2012; Mailing Date: Sep. 27, 2012 9 Pages.

* cited by examiner

DYNAMIC ERROR CORRECTION IN RADIOGRAPHIC IMAGING

CROSS-REFERENCE TO RELATED APPLICATIONS

This application claims priority of European Application No. 08 160 359.9 filed on Jul. 14, 2008. The disclosure of this application is hereby incorporated in its entirety, as part of the present disclosure.

FIELD OF THE INVENTION

The invention relates to a method for radiographic imaging, the method comprising the steps of:
- generating radiographic raw images of an object by means of an imaging system comprising an X-ray source and an X-ray detector and moving along a trajectory during an acquisition process of the radiographic raw images;
- generating displacement data describing the displacement of the moving object during the generation of the radiographic raw images by means of a sensor arrangement and by means of a control unit connected with the sensor arrangement;
- producing a view of the object by image processing of the radiographic raw images in the control unit wherein the displacement data are used for compensating the motion of the object.

The invention further relates to an apparatus for implementing the method.

BACKGROUND OF THE INVENTION

Such a method and such an apparatus is known from U.S. Pat. No. 7,187,749 B2. The known apparatus is provided for dental panoramic and tomographic imaging. According to the known method and the known apparatus the motion of a patient is detected during the imaging process by accelerometers attached to a positioning device and the radiographic raw images are shifted to correct for the motion of the patient.

A disadvantage of the known method and the known apparatus is that the shifting of the radiographic raw images is only suitable for compensating translational movements. The lack of compensation for arbitrary movement of the patient during the imaging process may result in blurring of the views obtained by the image processing.

In the field of tomography, blurring by motion is a common problem. For limiting the blurring effects patient support systems are usually provided for the purpose of holding body parts of the patient as still as possible with respect to the X-ray apparatus. For instance, in dental panoramic X-ray systems, which are also arranged for dental tomography, a bite may be provided, on which the patient can bite during the entire acquisition to limit the motion of the patient. In alternative arrangements, the patient lies on a bed and the body parts are kept still with the help of radio transparent head cushions and belts. However, even these tools are not sufficient for suppressing the motion of the patient completely.

EP 1,815,794 A1 discloses a positioning method for dental radiology and linear tomography. For positioning the patient with respect to an X-ray imaging system a set of video cameras is used to put the patient in a given desired position for the examination.

KAK & SLANEY, Principle of Computerized Tomographic Imaging, SIAM Society, 2001 is a text book containing details on various reconstruction methods used in computer-tomography, in particular frequency based reconstruction methods and various algebraic methods, for instance the so called Algebraic Reconstruction Techniques (=ART) and its derivatives, especially the Simultaneous Iterative Reconstruction Technique (=SIRT) and Simultaneous Algebraic Reconstruction Technique (=SART).

A general review on computer-tomography can be found in KALEDENDER, W. A.: X-ray computed tomography in: Phys. Med. Biol. 51 (2006) R29-R43.

MICHEL, D.; FRÉDÉRIC; HIROYUKI, K.: Two-dimensional rebinning of helical cone-beam computerized tomography data using John's equation, Inverse Problems, Volume 19, Issue 6, pp. S41-S54, 2003 describes a rebinning method for compensating the deviation of an x-ray imaging system moving around an object on a helical path from a two-dimensional slice on which a crossectional view of the object is generated.

DOBBINS III, J. T. and GODFREY, D. J.: Digital X-ray tomosynthesis: current state of the art and clinical potential, Phys. Med. Biol. 48 (2003) R65-R106 describes various reconstruction methods used in tomosynthesis.

SHEPP, L. A. and VARDI Y.: Maximum Likelihood Reconstruction for Emission Tomography, IEEE Trans. Med. Im., Vol. 1, 113-122, 1982 describes the application of a maximum likelihood method in positron emission tomography.

GB 23 84 155 A describes a video system which is used to align tomographic images of a patient to a radiotherapy system so that the tomographic images can be used for controlling the beam of the radio-therapy-system.

US 2006/0149134 A1 discloses a visual assisted guidance of an endoscope for bronchoscopy.

The use of a maximum likelihood approach for the deconvolution of images taken by a CCD-camera is discussed in BENVENUTO, F. and LA CAMERA, A. et al.: Study of an iterative method for the reconstruction of images corrupted by Poisson and Gauss noise, Inverse Problems 24, 2008.

An overview on biometric systems is given in JAIN, A. K. and ROSS, A.: Multibiometric Systems, Comm. ACM, Special Issue on Multimodal Interfaces, vol. 47, no. 1, pp. 34-40, 2004.

WISKOTT, J. et al.: Face recognition by elastic bunch graph matching. In L. C. Jain et al., editor: Intelligent biometric techniques in fingerprints and face recognition, pp. 355-396. CRC Press, 1999 describe methods for face recognition.

Further information of face recognition can also be found in FERIS, R. S. et al.: Hierarchical wavelet networks for facial feature localization, IEEE International Conference on Automatic Face and Gesture Recognition, 2002, pp. 118-123.

MIDDENDORFF, C.; BOWEYER, K.; YAN, P.: Multi-Modal Biometrics Involving the Human Ear, Proc. IEEE Conf. CVPR 07, 2007 describes methods for detecting the human ear.

M A, Y. et al.: Robust precise eye location under probabilistic framework, IEEE International Conference on Automatic Face and Gesture Recognition, 2004, pp. 339-344 discloses methods for the detection of eyes.

DARGHAM, J. and CHEKIMA, A.: Lips Detection in the Normalised RGB Colour Scheme Proc. 2nd Conf. on Information and Communication technologies, ICCTA, 2006, pp. 1546-1551, 2006 contain methods for detecting the lips of a person.

FROSIO, I. and BORGHESE, N. A.: Real-time accurate circle fitting with occlusions, Vol. 41, pp. 101-114, 2008 describes a method for an accurate location of circles inside images in the presence of a partial occlusion.

SUMMARY OF THE INVENTION

Proceeding from this related art, the present invention seeks to provide a method and an apparatus for digital radiography with improved motion compensation.

This object is achieved by a method having the features of the independent claim. Advantageous embodiments and refinements are specified in claims dependent thereon.

In the image processing an operator is used, which relates a plurality of radiographic raw images with the view of the object without transforming the radiographic images individually. The displacement of the object during the acquisition process is then taken into account by modifying the operator in dependency of the displacement data. By the method, the radiographic raw images can be used in the imaging process without any modifications which might induce errors in the reconstruction process. Furthermore, even complex movement, for instance movements involving various differently moving parts, can be taken into account by modifying the operator relating the plurality of radiographic raw images with the view, so that blurring can be effectively suppressed.

In the imaging process the displacement of the object during the acquisition process is taken into account by considering the object as stationary and replacing the actual trajectory by a virtual trajectory resulting in a spatial relation between the stationary object and the imaging system on the virtual trajectory that corresponds to the spatial relation between the displaced object and the imaging system on the actual trajectory. By the method, the radiographic raw images can be used in the imaging process with the appropriate spatial information concerning the relative location and orientation of the object with respect to the imaging system. Thus, the reconstruction process can be performed while taking into account the known relative position and orientation of the object with respect to the imaging system. By the method, even a complex movement can be appropriately treated, so that blurring can be effectively suppressed.

Preferably, the displacement data are associated with the individual radiographic raw images and describe the displacement of the object or of different parts of the object with respect to a previous position of the object at the exposure time of a previous radiographic raw image. Thus, each radiographic raw image can be used for the reconstruction process.

The control unit can be arranged for generating displacement data describing the rotational and translational displacement of the object during the acquisition process. Thus, the movement of the object or of its parts can be completely tracked.

The displacement data can be contained in affine displacement matrices that are associated with different parts of the object and that are determined by the control unit. In this case the virtual trajectory is created by applying the inverse of the affine displacement matrix to the actual trajectory. The affine displacement matrices are determined such that the cohesion of the different parts of the object is preserved. For example, the displacement data of the cranium and the mandible must be such that a contact point in the temporo-mandible joint is maintained.

The displacement data are preferably derived from surface images of the object or of its parts. The surface images can be acquired by a two-dimensional or three-dimensional vision capture system that preferably makes measurements in a contactless way using cameras that take two-dimensional or three-dimensional pictures. The information on the position and orientation of the object or of its parts are then derived from the surface images by the control unit. The surface images acquired by the vision capture system can be processed by the control unit using image registration and image subtraction, pattern analysis, template matching or curve fitting for deriving the displacement.

The displacement data can also be produced by means of three-dimensional scanners and the control unit can utilize three-dimensional surface matching or three-dimensional real time cross-correlation analysis for determining the displacement of the object.

The acquisition of spatial information data can be made more reliable, if markers placed on the object are detected by the sensor arrangement.

The data supplied by the sensor arrangement can be processed by the control unit with statistical techniques so that the most likely spatial relation between object and imaging system is determined. This method is particularly useful, if the data supplied by the sensor arrangement is affected by noise or if patterns must be recognized for the retrieval of the displacement data.

The sensor arrangement may comprise a sensor capable of detecting the actual acceleration or velocity of different parts of the object or of its parts. In this case the control unit determines the resulting displacement of the object by integrating the signal supplied by the acceleration or velocity sensor.

For improving the accuracy of the estimation of the motion of the object a time filtering is performed on the sequence of the displacement data based on extended Kalman filtering.

For adjusting the spatial position of the object with respect to the imaging system an object support system is utilized to position the object in a predefined position with respect to the imaging system before starting the X-ray exposure.

In a preferred embodiment the imaging process is a reconstruction process resulting in tomographic images.

The reconstruction process can be based on an algebraic method for solving a system of equations. These system of equations connects the absorption coefficients associated with volume elements of the object with projections values of radiographic images taken at various positions along the trajectory. The equations system is formed by means of weighted sums of the absorption elements along radiation paths associated with the projection values of the detector elements of the detector. The weighting coefficients depend on the length of a segment of a given radiation path lying within a given volume element. Therefore, the weighting coefficients depend on the direction of the radiation path of the radiation beams. For taking into account the virtual movement of the imaging system along the virtual trajectory the weighting coefficients are modified in dependency of the displacement data resulting in an image reconstruction with suppressed blurring effects.

In another preferred embodiment, a frequency based reconstruction process is used in which the absorption coefficient associated with a given volume element are obtained by applying a backprojection on the filtered radiographic raw images taken from various positions along the trajectory, wherein the backprojection is performed along the radiation paths associated with the imaging system on the virtual trajectory.

If the deviation of the virtual trajectory from the actual trajectory is small a frequency based reconstruction process can be used, in which the absorption coefficient associated with a given volume element are obtained by applying a rebinning process on the radiographic images. By the rebinning process the projection data of a two-dimensional slice of the object are estimated on the basis of the displacement data. After the rebinning process has been performed a two-dimensional reconstruction process can be applied to the projection data for reconstructing the required two-dimensional view of the object.

The object is preferably a body of a patient and the imaging system is preferably arranged for cone beam computer tomography, tomosynthesis, dental tomography, dental panoramic radiography, cephalography or medical scanography.

BRIEF DESCRIPTION OF THE DRAWINGS

Further advantages and properties of the present invention are disclosed in the following description, in which exemplary embodiments of the present invention are explained in detail based on the drawings.

DETAILED DESCRIPTION OF THE INVENTION

Figure 1:
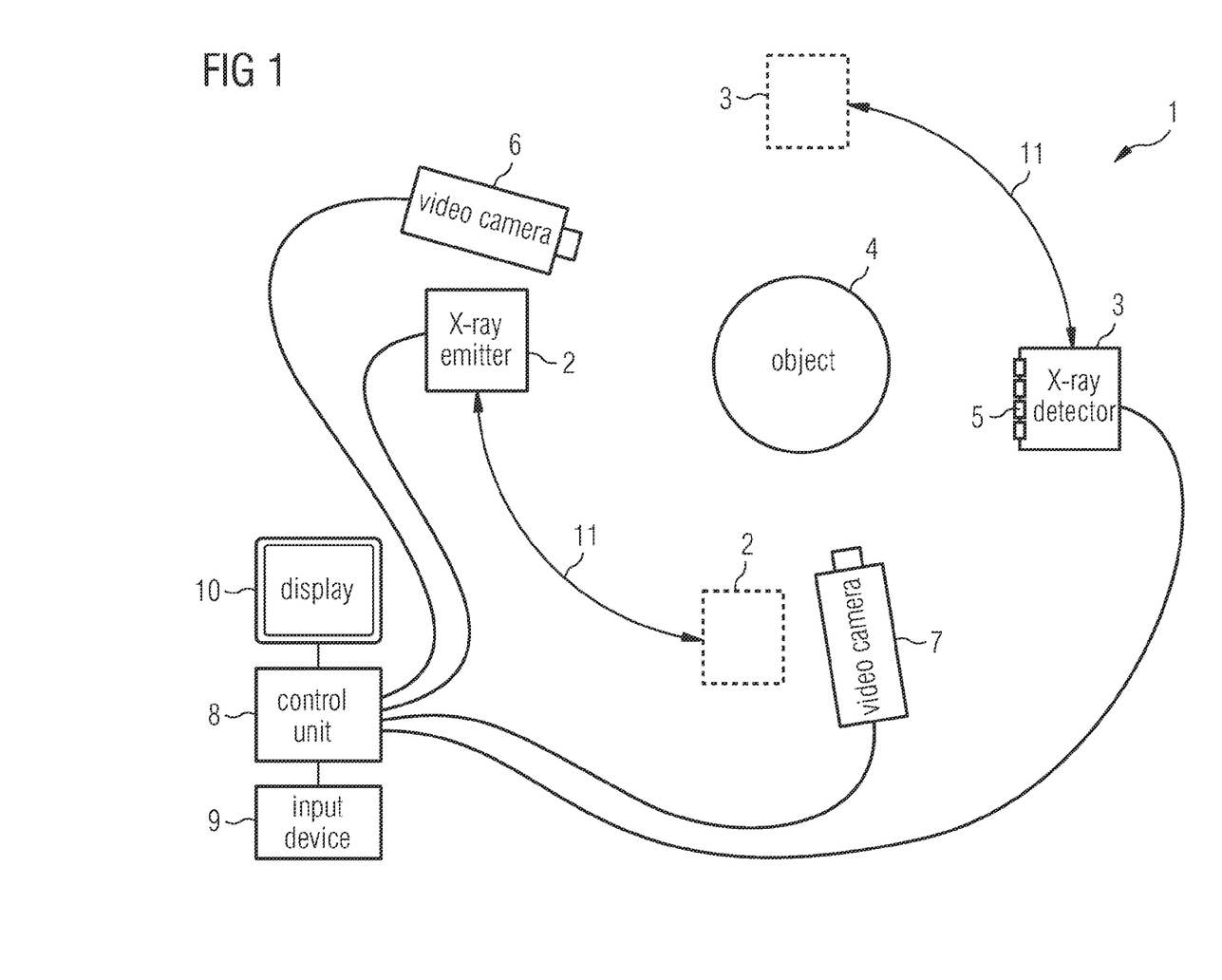
FIG. 1 illustrates an arrangement of devices used in digital tomographic imaging.

The method described here is used in a medical apparatus 1, for medical X-ray imaging, which can be used for tomographic imaging. The apparatus 1 can also be used for panoramic imaging. Such an apparatus has an X-ray emitter 2 and a X-ray detector 3 opposite one to the other, and an object 4 to be surveyed has to be placed between emitter 2 and detector 3. In the case of a medical apparatus 1 the object is a body part of a patient. The emitter 2 is generally an X-ray tube whereas the detector 3 is a digital detector comprising a plurality of detector elements 5. Correspondingly, the radiographic image is composed of a number of picture elements associates with the detector elements 5. These picture elements are also called pixels.

For tracking the motion of the object 4 during the acquisition of the radiographic images, the apparatus 1 is provided with video cameras 6 and 7.

The emitter 2, the detector 3 and the video cameras 6 and 7 are connected to a control unit 8 which is provided with an input device 9 such as a keyboard, a mouse or a similar device. The control unit 8 is further connected to a display 10 on which views of the object 4 can be displayed for the operator. In the case of the apparatus 1 these views can be panoramic images of the object 4, for instance panoramic images of the dental arc of a patient, or tomographic images of the object 4, for example a two- or three-dimensional tomographic image of a single tooth.

For tomographic imaging, the emitter 2 and the detector 3 are moved along a given trajectory 11. Along the trajectory, N radiographic images are acquired by the detector 3 at different positions resulting in N radiographic images taken under various projection directions.

The tomographic image of the object 4 can be reconstructed by applying a reconstruction procedure on the N radiographic images. If the trajectory 11 of the emitter 2 and the detector 3 is situated in a plane, the tomographic image corresponds to a two-dimensional cross-section through the object 4 along the plane. However, if the trajectory 11 is situated in a three-dimensional space the tomography algorithms generally transform a set of N two-dimensional X-ray images into a three-dimensional volumetric image.

It should be emphasized that the two-dimensional radiographic images are usually acquired sequentially, one after the other, therefore in different instants of time.

Figure 2:
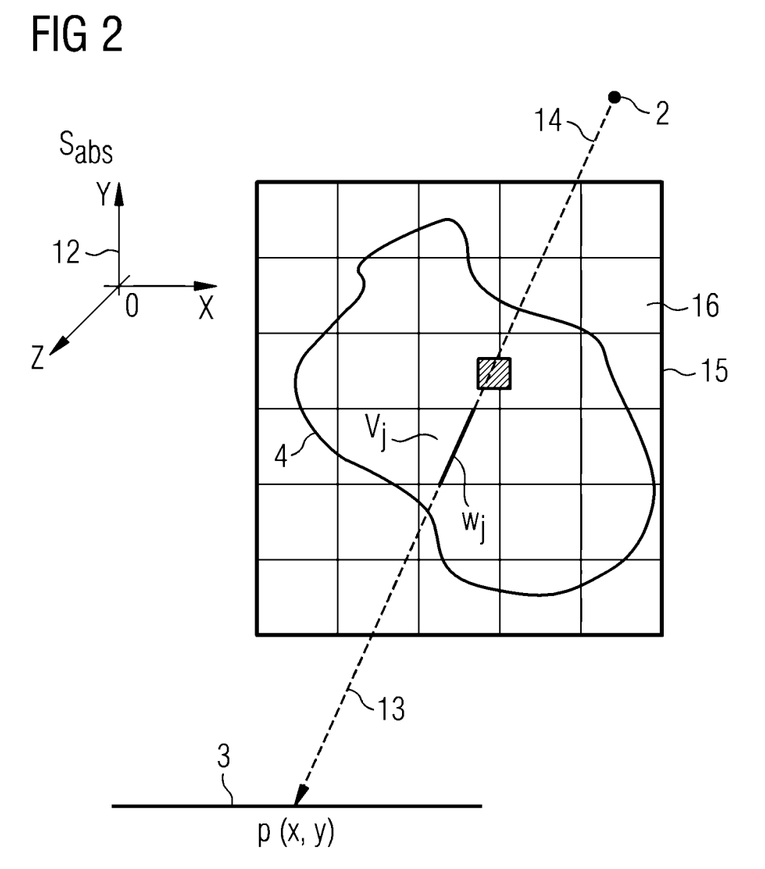
FIG. 2 shows the relative position of a reference system and an imaging system with respect to an object which has to be examined.

FIG. 2 shows a cross-section through the object 4. The cross-section extends in an XY-plane of a reference system 12. The projection value at the position p(x,y) of the radiographic image taken by the detector 3 represent the attenuation of an X-ray 13 through the object 4. In particular, the projection value taken by the detector 3 can be represented as the line integral of the attenuation coefficient of the material of the object 4. In particular the following relationship holds:

$$\ln \frac{N_e}{N_m} = \int_{ray} \mu(X, Y, Z) ds \qquad (1)$$

where $\mu(X,Y,Z)$ is the linear absorption coefficient measured in the point $P(X,Y,Z)$ within the object 4 and the ray is the straight line followed by the X-ray 13. $N_e$ is the number of photons emitted by the emitter 2 and $N_m$ the number of photons measured on the detector 3.

The overall X-ray attenuation along the X-ray 13 is measured by an pixel value in position p(x, y). In praxis the overall X-ray attenuation is represented as a gray level g(.). The gray level g(p(x,y)) is equal to:

$$g(p(x, y)) = N_e e^{-\int_{ray} \mu(X,Y,Z) ds} \qquad (2)$$

By taking the logarithm of the pixel value g(.) the following linear relationship between the negative logarithm of the pixel value and the absorption coefficients is obtained:

$$-\ln(g(p(x, y))) = -\ln(N_e) + \int_{ray} \mu(X, Y, Z) ds \qquad (3)$$

where the transfer function of the detector element 5 associated with the pixel p(x, y) is omitted for sake of clarity. If the number of photons emitted in all directions is the same, equation (3) can be simplified to:

$$-\ln(g(p(x, y))) = \int_{ray} \mu(X, Y, Z) ds \qquad (4)$$

In tomography, the position and orientation of the X-ray emitter 2 and of the detector 3 is supposed to be precisely known with respect to the reference system 12 for each acquired X-ray image. The spatial relationship of the emitter 2 and the detector 3 with respect to the reference system is called nominal geometry.

With respect to the reference system 12, that is fixed with respect to the apparatus 1, a tomographic volume 15 can be defined as a set of adjacent voxels 16, of given size, whose position is precisely known in the reference system 12: $V_j(P_{cj}(X_j,Y_j,Z_j))$, where $P_{cj}$ is the voxel center. The field of the absorption coefficients can be described by assigning an absorption coefficient to each voxel 16. For instance, the mean absorption coefficient $a(V_j(X_j,Y_j,Z_j))$ inside a voxel $V_j$ can be attributed to the voxel $V_j$:

$$a_j(V_j) = \frac{1}{V} \int_{\vec{x} \in V_j} a(\vec{x}) dV \quad (5)$$

An alternative representation can be obtained through basis functions, which allow avoiding discontinuities at the voxels borders. Such an approach is disclosed in SCHWEIGER, M. and ARRIDGE, S. R., Image reconstruction in optical tomography, using local basis functions, J. Electronic Imaging, Volume 12, Issue 4, pp. 583-593, 2003.

The projection equation (4) can also be discretized and written as:

$$-\ln(p(x,y)) = \sum_{j \in ray} w_j a_j(V_j) \quad (6)$$

The weights, $\{w_j\}$, in equation (6) express the partial volume effect due to the fact that the intersection of the X-ray 13 with the j-th voxel 16 has length $w_j$. We remark here, that given a certain nominal geometry the weights are uniquely determined as they depend only on the acquisition geometry.

Therefore, equation (6) can also be written for the i-th pixel in the n-th radiographic image as:

$$-\ln g_i(\vec{s}_n)) = \sum_{j \in ray_i} w_j(\vec{s}_n) a_j(V_j) \quad (7)$$

where $\vec{s}_n$ is the vector between the emitter 2 and the i-th pixel 5 of detector 3 at step n along the trajectory 11.

A set of weights is associated to each single radiographic image. These weights can be computed, for instance, from the intersection of a voxel 16 with the radiation path 14 connecting the center of each detector element 5 with the X-ray emitter 2.

The set of weights and the tomographic volume 15 are therefore uniquely determined once the nominal geometry has been defined.

Most of the techniques used for tomographic reconstruction are based on the hypothesis that a set of radiographic images are acquired in a known and equally spaced position on an arch of at least 180 degrees. Under this hypothesis, techniques in the frequency domain, based on the Radon transform, are used and produce a tomographic reconstruction in a reduced amount of time. This approach leads to the methods which can be applied to the case of fan shaped X-ray beams and cone shaped X-ray beams.

Another group of methods used to reconstruct tomographic images, are iterative techniques. These can be further subdivided into two large families: algebraic and statistically based techniques. Both approaches are based on equation (7).

Algebraic techniques, in particular the ART methods and its derivatives SART and SIRT produce a tomographic image by solving a very large linear system of N*M equations (7), one for each of the M pixels constituting the N radiographic images acquired. The unknowns of the equation system are the absorption coefficients $\{a_j\}$.

In statistical based techniques a tomographic image is obtained as the one which maximizes the likelihood of the data, possibly adding constraints to the solution. This is an approach which was started in positron emission tomography (=PET) imaging and astrophysics and which is also applicable to the field of X-ray radiography and tomography.

The last group of tomographic methods is represented by tomosynthesis. In this family of methods the reconstruction is obtained as a set of parallel planes or slices. The algorithm is quite simple as it is based on shifting and eventually scaling, by an adequate amount, the images, and adding them together.

The underlying hypothesis of all these methods is that the object 4 is keeping still during the entire acquisition that is from the acquisition of the first radiographic image to the acquisition of the N-th one. Therefore the object 4 is supposed to have the same eventually unknown position and orientation inside the tomographic volume 15. In praxis, however, the object 4 is rarely keeping still. In particular, a living organism hardly keeps still for a while. The motion of the object 4 also affects the quality of the view, which is generated from the radiographic images.

Figure 3:
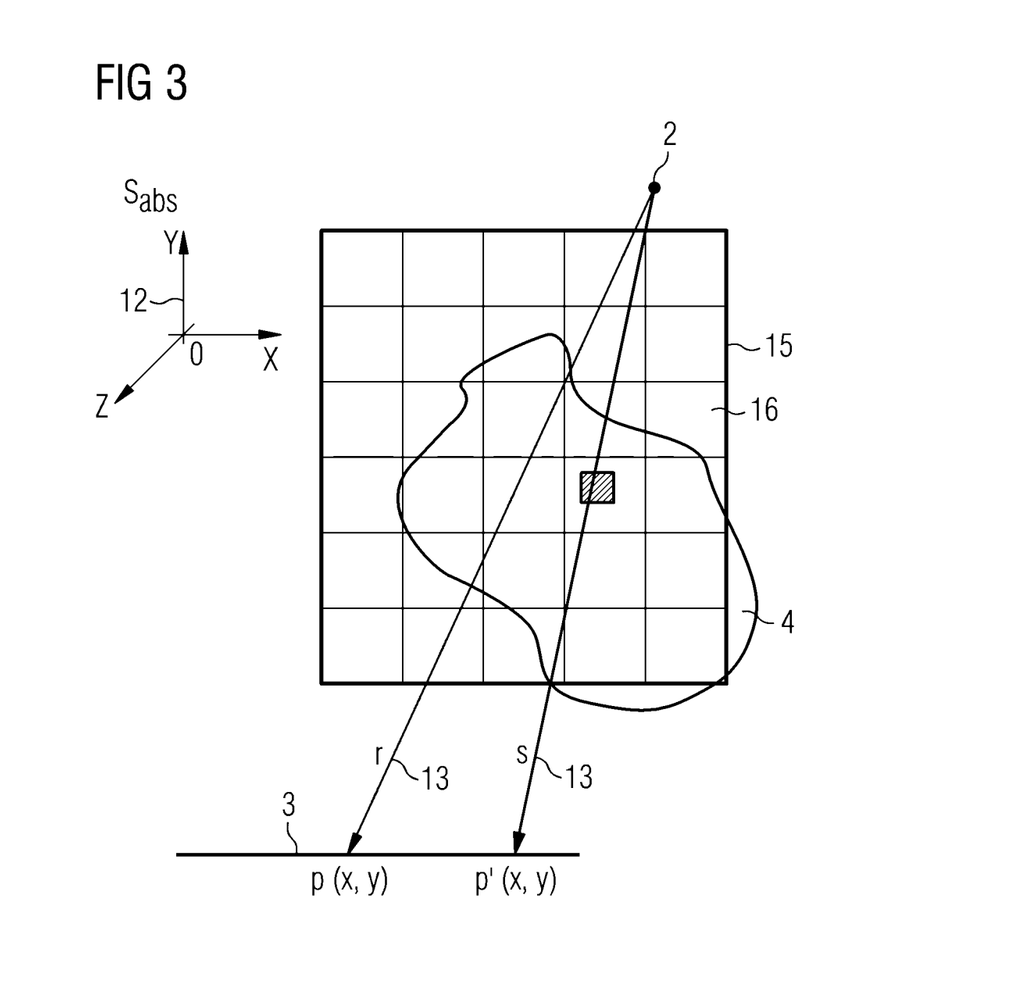
FIG. 3 illustrates the spatial relationship of the reference system and the imaging system with respect to the object after the object has moved.

FIG. 3 depicts the situation that the object has moved with respect to the situation shown in FIG. 2. When the object 4 is moving, the object region crossed by a certain X-ray 13 denoted by r in FIG. 3 and projected onto a point p(x,y) with the nominal geometry, is crossed by a different X-ray 13 denoted s and projected onto a different point p'(x,y) of the radiographic image.

The integral absorption measured at site p(x,y) is therefore attributed to a wrong voxel due to the motion of the object 4, and this distorts the reconstruction and produces what is called blurring by motion in the reconstructed tomographic image.

It should be noted that a typical voxel size of 100 μm is required to see the anatomical details in a dental radiography; therefore blurring due to motion should stay inside this range. Therefore any blur compensation mechanism should achieve such accuracy.

Figure 4:
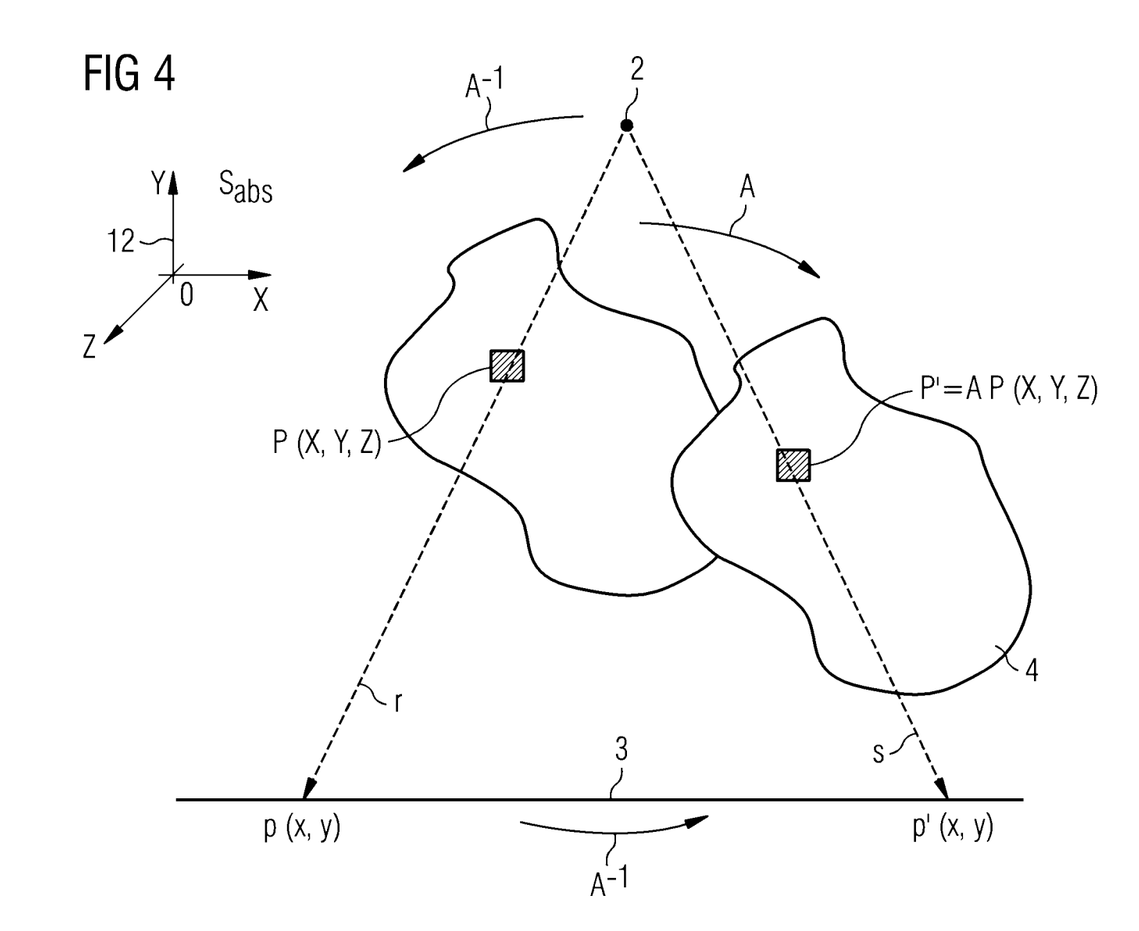
FIG. 4 demonstrates the effect of various transformations used to describe and to compensate for the movement of the object.

Let us suppose that the object 4 had moved rigidly in the time interval between two radiographic images. The motion can be described by an affine matrix A, which contains the translation vector and the rotation matrix as depicted in FIG. 4. All the points {P} of the object 4 are moved to points given by AP, in homogeneous coordinates. The voxel centers $P_{cj}$ are moved accordingly by $AP_{cj}$. Details on the construction of such affine matrices can be found in HARTLEY, R. and ZISSERMAN, A.: Multiple view geometry in Computer Vision, 2nd edition, Cambridge University Press, 2004.

In particular, n affine matrices $A_n$ which corrects for the motion of the object 4 are uniquely defined for each radiographic image.

According to equation (7) the effect of the displacement of the object 4 can then be expressed as:

$$-\ln g_i(\vec{s}_n)) = \sum_{j \in ray_i} w_j(\vec{s}_n) a'_j(V_j) \quad (8)$$

with $$a'_j(V_j) = \frac{1}{V} \int_{\vec{x} \in V_j} a(A_n^{-1} \vec{x}) dV \quad (9)$$

Therefore, the number of unknowns is largely increased since the coefficients $a'_j$ are associated with a region which is different from the region associated with the coefficient $a_j$.

With the knowledge of the matrix A, the ray s passing through the voxel center $P_{cj}$ and the emitter position $P_e$ and the intersection point p'(x,y) of the X-ray s with the image plane of the detector 3 can be determined after the object 4 has moved. The point p'(x,y) depends both on the motion of the object 4 and on the geometry of the acquisition system, namely the relative distance between the object 4, the emitter 2 and the image plane of the detector 3.

In practical applications, for each X-ray 13 through the image plane of the detector 3 and the center of the emitter 2, the voxels 10 crossed after the motion of the object 4 can be determined along with the new length $w_j$ of the radiation path covered inside the j-th voxel.

This allows rewriting the set of projection equations (7), where the set of voxels 16 crossed by the ray has been predetermined along with their associated weights. Equation (7) then reads:

$$-\ln g_i(\vec{s}'_n)) = -\ln g_i(A_n^{-1}\vec{s}_n) = \sum_{j \in ray_i} w_j(A_n^{-1}\vec{s}_n)a_j(V_j) \quad (10)$$

In equation (10) the affine matrix $A_n$ has been applied to the reference system 12 as well resulting in a virtual trajectory that originates from the actual trajectory in the original reference system by applying the inverse $A_n^{-1}$ of the affine matrix $A_n$ to the actual trajectory. This is nothing else than treating the object as stationary and replacing the actual trajectory by a virtual trajectory which results from applying the inverse $A_n^{-1}$ of the affine matrixes $A_n$ to the positions of the actual trajectory.

The motion of multiple parts of the object 4 can be tracked separately with the constraint of a cohesive motion of the individual parts of the object 4. Equation (10) must then be modified accordingly:

$$-\ln g_i(\vec{s}'_{n,k})) = -\ln g_i(A_{n,k}^{-1}\vec{s}_n) = \sum_{j \in ray_i} w_j(A_{n,k}^{-1}\vec{s}_n)a_j(V_j) \quad (11)$$

where the index k=0, 1, 2, . . . refers to the different parts of the object 4, $\vec{s}_{n,k}$ are the vectors between the emitter 2 and the i-th pixel 5 of detector 3 at step n along the virtual trajectory relating to part k of the object 4 and $A_{n,k}$ are the affine matrices that are associated with different parts of the object 4 and that are different for pixels that are associated with different parts of the object 4.

The solution of equation (10) or (11) then proceeds using standard techniques associated with algebraic, statistical or tomosynthesis methods.

Instead of determining individual virtual trajectories for the different parts of the object 4 it is also possible to solve a system of equations (8), in particular with algebraic and statistical methods, in which $A_n^{-1}$ depends also on k or $\vec{x}$.

It should be noted that the apparatus 1 can also acquire a sequence of radiographical images under a limited angle to produce a three-dimensional local tomographic image. Such a mode of operation is also called limited angle tomography. Alternatively it can be used to create a panoramic radiography.

Iterative methods and tomosynthesis do not pose any constraint on the geometry of the trajectory used for the acquisition of the radiographic images and are therefore suitable methods for the compensation of the motion of the object 4.

However, the basic approach of the method described above can also be applied to frequency spaced methods, which generally require a particular spatial arrangement of the radiographic images, for instance the radiographic images to be equally spaced along the trajectory.

In the context of the frequency based methods the measured radiographic images are also called projection images. According to one method called filtered backprojection, these projection images can be filtered by convolution with the kernel of the Hilbert transform and are then backprojected along the x-rays 13 of the radiation fan. If the moved object 4 is considered as stationary with respect to the reference system 12 whereas the actual trajectory 11 is replaced by a virtual trajectory resulting in a spatial relation between the stationary object 4 and the imaging system on the virtual trajectory that is the same as the spatial relation between the displaced object 4 and the imaging system on the actual trajectory 11, the backprojection can be performed along the x-rays 13 of the radiation fan originating from the virtual position of the emitter 2. This approach can be used independent from the extent of the motion of the object 4.

It should be noted that different group of pixels associated with different objects will be associated with different virtual trajectories. In some cases it might also be useful to separate the radiographic images into sets of partial radiographic images that represent the different part of the body. The separation can be performed based on an estimate of the relative bone thickness of the components. Then the reconstruction process can be performed based on the set of partial radiographic images. The partial views of the reconstructed vies of parts of the object can finally be recombined to a single view of the object.

If the motion of the object 4 is sufficiently small the so called rebinning methods can also be used. These methods are generally used for tomographic imaging in which the imaging system is moving around the object on a helical path. In these cases, the position of the emitter 2 of the radiation fan moving around the object deviates from the image plane in which the view of the object is generated and a correction for the deviation of the actual trajectory from the image plane is determined by the rebinning methods. The deviation of the virtual trajectory from the actual preset trajectory 11 can then be treated similar to the deviation of the helical path from the image plane.

For tracking the motion of the object 4, the apparatus 1 is endowed with a pair of video cameras 6 and 7 positioned at the side of the trajectory 11, as depicted in FIG. 1. The video cameras 6 and 7 are positioned at an angle slightly larger than ninety degrees, observing the object 4. The cameras 6 and 7 are supposed to be registered to the apparatus 1 so that the position of the detector of the video cameras 6 and 7 is available in the same reference system 12 in which, the trajectory 11 of the X-ray emitter 2 and of the detector 3 is given.

Image processing techniques are used to detect the motion of the object 4. In case of dental tomography the object 4 is the head of the patient and the motion of the head is measured on the image plane of each camera 6 or 7.

Among the image processing techniques, image subtraction is implemented in a preferred embodiment to get the rough estimate of the displacement of the object 4 with respect to each radiographic image. For image subtraction an image of the background without the object is subtracted from an image of the background with the object 4.

This rough estimate can then be refined by using image processing techniques tailored to identify specific head anatomical features. These techniques allow to better identify the head displacement on the images of the video cameras, in particular the two-dimensional displacement.

In particular flexible template matching can be used to accurately identify the ear, surveyed by a lateral camera 12, and track the motion of the head in the sagittal plane.

Template matching and curve fitting can be used to accurately track the eyes pupils. The pupils position can be used to initialize a curve which can be used to fit the eye profile. By the eye profiles the motion of the head in a coronal plan can be tracked.

Edge detection techniques can be used to detect both the profile of the mandible and the profile of the cranium.

A similar approach can be used to identify the lips profile.

From the multiple displacement estimates obtained, for instance, with the above mentioned techniques, the three-dimensional motion of the object 4 or its parts can be derived by standard photogrammetric techniques. It should be noticed that in most cases only the translational component of the motion will be detected, as for very small movement as those foreseen when the object 4 is requested to stay still, the rotation and translational component can be lumped together.

During this process, the different sensitivity to the different degrees of freedom offered by each feature should be taken into account. For instance, the eye profile is quite accurate to identify the vertical position, while it is may not be so precise in the location of the horizontal position. This allows obtaining the maximum accuracy. The two-dimensional measurements got from the different features can therefore be pulled together and weighted to derive the head displacement onto the image.

In a modified embodiment only one video camera 6 or 7 is provided. In this case, motion in only one plane can be tracked. This can be adopted in a machine, whose head resting frame would constraint head motion to a plane.

In a different embodiment, the apparatus can be equipped with one or more three-dimensional cameras. In this case, three-dimensional surface matching techniques or three-dimensional cross-correlation can be used to detect the motion of the head or part thereof, for instance the cranium and the mandible. In this case partial matches can be adopted. These techniques could be used in addition or not to feature detection.

In an alternative embodiment, a set of radiolucent markers are attached to the head of the patient. In this case the features extracted from the images, are the markers themselves, and the position of the features is coincident with the center of the marker. High accuracy statistical techniques can be used for this scope as disclosed in FROSIO and BORGHESE. In this embodiment, markers can be placed for instance on an elastic band or attached by adhesive tape which can be easily worn by the patient. It should be noted that the absolute spatial position of these markers need not to be determined as the markers are used to determine the relative displacement from the initial arbitrary three-dimensional position over time.

Other types of sensors can be used with or without the video cameras 6 and 7 to track the displacement of the head or parts thereof.

In an alternative embodiment, the radiolucent markers can be substituted by active radiolucent markers, which actively signal their position in three-dimensional space. This can be done through radio-frequency transmission, for instance by RF-ID tags.

Motion of the object can also be determined by one of the many motion capture technologies available. For instance but not exclusively, marker-based motion capture, active markers motion capture, accelerometers and gyroscope-based motion capture, computer vision based techniques can be used. Other methods uses techniques like real-time three-dimensional cross-correlation of three-dimensional images acquired by three-dimensional cameras.

As mentioned above, when multiple rigid objects have to be considered, for instance the skull and the mandible, which move differently, the above procedure can be generalized. The motion of the multiple objects can be tracked separately, with the constraint of congruency of motion. In this case a set of matrixes, $\{A_B\}$ is obtained, one for each object B, which is used to correct the relative position of that particular object, with respect to the apparatus reference frame.

A further improvement of the method can be obtained by considering each matrix $A_n$ or $A_{n,k}$ as an additional unknown inside the computing machinery used to produce the output image. This machinery usually boils down into optimization procedures. Therefore, in this case, the motion tracking apparatus, if present, produces a reliable initialization of the patient position in each instant of time.

A time filtering on the sequence of the estimated displacements can be inserted, based on extended Kalman filtering, to improve the accuracy of the estimate of the patient motion.

This method described herein can be applied to all imaging techniques in which the final view is obtained from a set of raw images acquired sequentially in time and for which the absence of motion of the object cannot be guaranteed. Domains of application can be panoramic imaging, fan beam or cone beam CT or computer assisted tomography, digital panoramic radiography and digital cephalography and all those fields where the output image is obtained starting from a set of X-ray images and or image sensor data acquired sequentially.

The method can be applied to any imaging system of an object which produces an output view from a set of raw images, each of which needs a geometrical correction, which can be computed through motion capture of the object.

From an abstract point of view, the computational operations needed for the image processing can be summarized into a single operator which relates the raw images with the final view:

$$h_j = F_j(\vec{s}_1, \ldots, \vec{s}_N)[(g_i(\vec{s}_1), \ldots, g_i(\vec{s}_N))_{i \in detector}] \quad (11)$$

where $h_j$ is the j-th image value of the final view, $g_i$ is the value of the i-th pixel of the raw images, $\vec{s}_n$ is the vector between the emitter and the i-th pixel of the detector at step n along the trajectory and $F_j(\vec{s}_1, \ldots, \vec{s}_N)$ is the operator relating the j-th image value of the final image with the pixel values of the raw images at the positions represented by $\vec{s}_1$ up to $\vec{s}_N$. In the case of a tomographic reconstruction with algebraic methods, $h_j$ is the absorption coefficient associated with the voxels j and equation (11) is nothing else than the equation (7) solved for the absorption coefficients $a_j$.

In case of a displacement of the object at step n along the trajectory the disturbance can be expressed as:

$$h'_j = F_j(\ldots, \vec{s}_m, \ldots)[(\ldots, g'_i(\vec{s}_n), \ldots)_{i \in detector}] \quad (12)$$

which can be compensated by replacing the actual trajectory by a virtual trajectory:

$$h_j = F_j(\ldots, A^{-1}\vec{s}_n, \ldots)[(\ldots, g'_i(A^{-1}\vec{s}_n), \ldots)_{i \in detector}] \quad (13)$$

Thus, the disturbance is compensated by the modification of the operator $F_j$.

It should be noted that $F_j$ needs not to be an operator used for the reconstruction of tomographic images but may also be an operator used for tomosynthesis, dental panoramic radiography, cephalography or medical scanography.

The method and the apparatus described herein provide a radiographic apparatus endowed with a system capable of tracking the motion of the object 4 in real-time and a method to derive from the motion information an efficient correction for each acquired radiographic image.

The great advantage obtained by this method is evident as it would allow to stabilize the object 4 of the tomography and therefore to potentially increase the resolution and the clarity of the tomographic images.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds or groups described in conjunction with a particular aspect, embodiment or example of the invention are to be understood to be applicable to any other aspect, embodiment or example described herein unless incompatible therewith.

What is claimed is:

1. An apparatus for radiography with X-rays, comprising:
an imaging system comprising an X-ray source and an X-ray detector for generating radiographic raw images of an object;
a sensor arrangement adapted for determining displacement data of the object;
a control unit adapted for controlling the motion of the imaging system and for generating a view of the object based on the radiographic raw images by an imaging processing, in which
an operator is used, which relates a plurality of radiographic raw images with the view of the object without transforming the radiographic images individually, in which
the displacement of the object during an acquisition process is taken into account by modifying the operator in dependency of the displacement data, and in which
the displacement data are determined individually with respect to differently moving parts of the object while maintaining a cohesion of the different parts of the object;
wherein a reconstruction process resulting in tomographic images is used for the imaging processing; and
wherein the reconstruction process is based on an algebraic method for solving a system of equations, the system of equations connecting absorption coefficients associated with volume elements of the object with projection values of the radiographic raw images taken at various positions along a trajectory by calculating a weighted sum of absorption elements along radiation paths associated with the projection values, the weighting coefficient depending on the length of a segment of a given radiation path lying within a given volume element, and the trajectory being defined by the motion of the of the imaging system, and wherein the weighting coefficients are modified in dependency of the displacement data.

2. The apparatus according to claim 1, wherein the control unit is generating displacement data describing rotational and translational displacement of the object during the acquisition process.

3. The apparatus according to claim 1, wherein the sensor arrangement comprises one of a two-dimensional or three-dimensional vision capture system which is adapted for acquiring surface images of the object and wherein the displacement data are derived from the surface images.

4. The apparatus according to claim 3, wherein the control unit is adapted for processing the surface images by image registration and image subtraction, pattern analysis, template matching or curve fitting.

5. The apparatus according to claim 1, wherein the sensor arrangement comprises three-dimensional scanners and wherein the control unit utilizes one of three-dimensional surface matching or three-dimensional real time cross-correlation analysis for determining the displacement data.

6. An apparatus for radiography with X-rays, comprising:
an imaging system comprising an X-ray source and an X-ray detector for generating radiographic raw images of an object;
a sensor arrangement adapted for determining displacement data of the object;
a control unit adapted for controlling the motion of the imaging system and for generating a view of the object based on the radiographic raw images by an imaging processing, in which
an operator is used, which relates a plurality of radiographic raw images with the view of the object without transforming the radiographic images individually, in which
the displacement of the object during an acquisition process is taken into account by modifying the operator in dependency of the displacement data, and in which
the displacement data are determined individually with respect to differently moving parts of the object while maintaining a cohesion of the different parts of the object;
wherein a reconstruction process resulting in tomographic images is used for the imaging processing; and
wherein a frequency based reconstruction process is used, in which absorption coefficients associated with a given volume element are obtained by applying a backprojection on filtered radiographic raw images taken from various positions along a trajectory, wherein the backprojection is performed along the radiation paths associated with the imaging system on a virtual trajectory.

7. The apparatus according to claim 6, wherein the control unit is generating displacement data describing rotational and translational displacement of the object during the acquisition process.

8. The apparatus according to claim 6, wherein the sensor arrangement comprises one of a two-dimensional or three-dimensional vision capture system which is adapted for acquiring surface images of the object and wherein the displacement data are derived from the surface images.

9. The apparatus according to claim 8, wherein the control unit is adapted for processing the surface images by image registration and image subtraction, pattern analysis, template matching or curve fitting.

10. The apparatus according to claim 6, wherein the sensor arrangement comprises three-dimensional scanners and wherein the control unit utilizes one of three-dimensional surface matching or three-dimensional real time cross-correlation analysis for determining the displacement data.

11. An apparatus for radiography with X-rays, comprising:
an imaging system comprising an X-ray source and an X-ray detector for generating radiographic raw images of an object;
a sensor arrangement adapted for determining displacement data of the object;

a control unit adapted for controlling the motion of the imaging system and for generating a view of the object based on the radiographic raw images by an imaging processing, in which an operator is used, which relates a plurality of radiographic raw images with the view of the object without transforming the radiographic images individually, in which the displacement of the object during an acquisition process is taken into account by modifying the operator in dependency of the displacement data, and in which the displacement data are determined individually with respect to differently moving parts of the object while maintaining a cohesion of the different parts of the object;

wherein a reconstruction process resulting in tomographic images is used for the imaging processing; and wherein a frequency based reconstruction process is used, in which absorption coefficients associated with a given volume element are obtained by applying a rebinning process on the radiographic raw images, in which projection data of a two-dimensional slice of the object are estimated on the basis of the displacement data, and by applying a two-dimensional reconstruction process on the projection data.

12. The apparatus according to claim 11, wherein the control unit is generating displacement data describing rotational and translational displacement of the object during the acquisition process.

13. The apparatus according to claim 11, wherein the sensor arrangement comprises one of a two-dimensional or three-dimensional vision capture system which is adapted for acquiring surface images of the object and wherein the displacement data are derived from the surface images.

14. The apparatus according to claim 13, wherein the control unit is adapted for processing the surface images by image registration and image subtraction, pattern analysis, template matching or curve fitting.

15. The apparatus according to claim 11, wherein the sensor arrangement comprises three-dimensional scanners and wherein the control unit utilizes one of three- dimensional surface matching or three-dimensional real time cross-correlation analysis for determining the displacement data.

16. An apparatus for radiography with X-rays, comprising:
an imaging system comprising an X-ray source and an X-ray detector for generating radiographic raw images of an object;
a sensor arrangement adapted for determining displacement data of the object;
a control unit adapted for controlling the motion of the imaging system and for generating a view of the object based on the radiographic raw images by an imaging processing, in which an operator is used, which relates a plurality of radiographic raw images with the view of the object without transforming the radiographic images individually, in which the displacement of the object during an acquisition process is taken into account by modifying the operator in dependency of the displacement data, and in which the displacement data are determined individually with respect to differently moving parts of the object while maintaining a cohesion of the different parts of the object;

wherein, in the imaging processing, the displacement of the object during the acquisition process is taken into account by treating the object as stationary and replacing an actual trajectory of the imaging system by a virtual trajectory resulting in a spatial relation between the stationary object and the imaging system on the virtual trajectory that corresponds to a spatial relation between the displaced object and the imaging system on the actual trajectory.

17. The apparatus according to claim 16, wherein an affine displacement matrix is determined by the control unit as displacement data and wherein the virtual trajectory is created by applying the inverse of the affine displacement matrix to the actual trajectory.

18. The apparatus according to claim 16, wherein the control unit is generating displacement data describing rotational and translational displacement of the object during the acquisition process.

19. The apparatus according to claim 16, wherein the sensor arrangement comprises one of a two-dimensional or three-dimensional vision capture system which is adapted for acquiring surface images of the object and wherein the displacement data are derived from the surface images.

20. The apparatus according to claim 19, wherein the control unit is adapted for processing the surface images by image registration and image subtraction, pattern analysis, template matching or curve fitting.

21. The apparatus according to claim 19, wherein the sensor arrangement comprises three-dimensional scanners and wherein the control unit utilizes one of three-dimensional surface matching or three-dimensional real time cross-correlation analysis for determining the displacement data.

* * * * *